(12) United States Patent
Bowe et al.

(10) Patent No.: US 12,703,210 B2
(45) Date of Patent: Aug. 11, 2026

(54) TRAILER CARIED WEIGHT DISTRIBUTION HITCH

(71) Applicant: Curt Manufacturing, LLC, Eau Claire, WI (US)

(72) Inventors: Curtis M. Bowe, Chippewa Falls, WI (US); Joel D. Diller, Eau Claire, WI (US)

(73) Assignee: Curt Manufacturing, LLC, Eau Claire, WI (US)

( * ) Notice: Subject to any disclaimer, the term of this patent is extended or adjusted under 35 U.S.C. 154(b) by 374 days.

(21) Appl. No.: 18/384,603

(22) Filed: Oct. 27, 2023

(65) Prior Publication Data

US 2024/0140151 A1 May 2, 2024

Related U.S. Application Data

(60) Provisional application No. 63/419,809, filed on Oct. 27, 2022.

(51) Int. Cl.

| | |
|---|---|
| ***B60D 1/06*** | (2006.01) |
| ***B60D 1/167*** | (2006.01) |
| ***B60D 1/24*** | (2006.01) |
| ***B60D 1/52*** | (2006.01) |

(52) U.S. Cl.
CPC ............. *B60D 1/247* (2013.01); *B60D 1/065* (2013.01); *B60D 1/167* (2013.01); *B60D 1/52* (2013.01)

(58) Field of Classification Search
CPC ........ B60D 1/065; B60D 1/167; B60D 1/247; B60D 1/52
See application file for complete search history.

(56) References Cited

U.S. PATENT DOCUMENTS 5,465,991 A 11/1995 Kass et al.
5,951,036 A 9/1999 Sargent
6,142,500 A * 11/2000 Sargent .................. B60D 1/075 280/483
6,286,851 B1 * 9/2001 Sargent .................. B60D 1/075 280/455.1
6,536,793 B2 * 3/2003 Sargent .................. B60D 1/247 280/455.1
7,857,344 B2 12/2010 Hensley
10,183,536 B2 1/2019 McCoy et al.
10,675,931 B2 6/2020 Anderson
11,331,970 B2 5/2022 Hall
11,724,554 B2 8/2023 Hall
(Continued)

*Primary Examiner* — Erick R Solis
(74) *Attorney, Agent, or Firm* — Shewchuk IP Services, LLC; Jeffrey D. Shewchuk

(57) ABSTRACT

A weight distribution hitch system has a head and a horn which are readily separable. The horn is attachable to the towing vehicle. Forward of the hitch ball, the head includes a downwardly projecting hook portion. The head defines a head hitch pin opening spaced from the hook portion, and the mating interaction between the hook portion and the rest recess allow the horn hitch pin opening to be aligned relative to the head hitch pin opening to allow insertion of a hitch pin to complete the hitching connection. Two snap-up brackets are attached to the trailer frame and used to lift the weight distribution spring bars each using a handle. The head with its hitch ball and weight distribution spring bars as well as the snap-up brackets can be left attached to the trailer frame even when not being towed.

20 Claims, 10 Drawing Sheets

(56) References Cited

U.S. PATENT DOCUMENTS

| | | | | |
|---|---|---|---|---|
| 2016/0082794 | A1 | 3/2016 | Mauerman et al. | |
| 2020/0324591 | A1* | 10/2020 | McCall | B60D 1/247 |
| 2022/0332155 | A1* | 10/2022 | Draper | B60D 1/247 |
| 2023/0070869 | A1* | 3/2023 | Anderson | B60D 1/167 |
| 2023/0234409 | A1* | 7/2023 | Bodily | B60D 1/06 280/456.1 |
| 2023/0415527 | A1* | 12/2023 | Wyers | B60D 1/06 |
| 2024/0010035 | A1* | 1/2024 | Jelinek | B60D 1/46 |

* cited by examiner 10
38
90
112
36
98
124
28
34
124
98
26
90
118
112
36
104
126
34
74
22
76
44
64
42
12
40
46
30
30
32
16
30
20
18

10
12
14
30
56
50
52
40
22
24
86
72
88
32
54
34
34
36
36
90
90
92
94
98
124
98
104
104

126
24
26
34
22
44
40
42
88
30
12
62
32
46
30

40
84
48
48
46
54
84
42
86
$\theta_w$ 40
48
85
66
52
48
46
54
50
64
42
68
84

40
$\theta_h$
42
$\theta_e$
52
86
66
85
64
68
48
84
54
50
46

40
86
84
64
42
68
84

22
76
74
76
88
44
70
78
130

76
θf
80
80
74
22
88
44
76

22
17
130
130

17
22
76
44
80
70
78
130

22
74
82
76
70
78

22
128
128
76
82
76
88
θr
80
74
80

TRAILER CARIED WEIGHT DISTRIBUTION HITCH

CROSS-REFERENCE TO RELATED APPLICATION(S)

The present application claims priority from U.S. Provisional Application No. 63/419,809 entitled TRAILER CARRIED WEIGHT DISTRIBUTION HITCH filed Oct. 27, 2022, incorporated herein by reference.

BACKGROUND

The present invention relates to weight distribution ("WD") hitches. WD hitches typically allow transmission of the towing force through a tow ball (the center of which defines the articulation point for turns, for proceeding over crests and troughs of hills, and for permitting a changing side-to-side slope of the road bed), while also having at least one and more commonly two arms which extend rearwardly and contact the towed trailer (or other vehicle) rearward of the tow ball. Typical prior art examples of WD hitches are shown in expired U.S. Pat. Nos. 5,465,991 and 5,951,036, incorporated by reference. WD hitch systems are helpful and needed to better distribute the vertical load (tongue weight) of a trailer to the front and rear axles of the towing vehicle, rather than transmit excessive tongue weight to only the rear axle. Some jurisdictions may require use of a WD hitch system if the trailer weight exceeds 50% of the towing vehicle weight.

To achieve the best ride and towing experience, the angle of the hitch head and the spring force on the weight distribution arms must be properly adjusted to account for the tongue weight and elevation and angle (generally level) of the towed vehicle (trailer) tongue relative to the hitch receiver tube. These factors require not only initial set-up of the WD hitch, but can also require adjustment of the WD hitch as different trailers or different loads are being towed.

WD hitches are often quite heavy for lifting and maneuvering by hand, particularly depending upon the strength of the user. Unlike a simple hitch ball mount, the hitch head and the arms of WD hitches are considered too large/lengthy to leave attached out the back of the towing vehicle receiver tube when a towed vehicle (trailer) is not being towed. Connection/disconnection and storage of a WD hitch (to switch from towing arrangements to non-towing arrangements) is commonly difficult and cumbersome. Better weight distributing hitch solutions are needed.

BRIEF SUMMARY OF THE INVENTION

The present invention is a weight distribution hitch system with a head and a horn which are readily separable, as well as a method of hitching using the weight distribution hitch system. The horn is preferably attachable to a shank at any of a plurality of angles and elevations relative to the shank, and the horn and shank can be left attached to the towing vehicle even when not used for towing. The horn has a seat with a rest recess accessible from above and defines a horn hitch pin opening spaced from the rest recess. The head supports a hitch ball exposed for the trailer coupler as well as the weight distribution spring bars, all of which can be left attached to the trailer at its trailer coupler even when not being towed. Forward of the hitch ball, the head includes a downwardly projecting hook portion. The head defines a head hitch pin opening spaced from the hook portion, and the mating interaction between the hook portion and the rest recess allow the horn hitch pin opening to be aligned relative to the head hitch pin opening to allow insertion of a hitch pin into the aligned horn hitch pin opening and head hitch pin opening. In another aspect, the weight distribution hitch system includes two snap-up brackets to lift the weight distribution spring bars each using a handle, and the snap-up brackets can be left attached to the trailer frame even when not being towed. After initial set-up, the user can hitch up merely by aligning the towing vehicle and trailer such that the hook portion is over the rest recess, lower the hook portion down using the trailer jack, and insert the single hitch pin into the aligned horn hitch pin opening and head hitch pin opening. The invention thus provides a weight distribution solution that doesn't require user lifting and manipulation of heavy parts to change between towing and non-towing configurations.

While the above-identified drawing figures set forth preferred embodiments, other embodiments of the present invention are also contemplated, some of which are noted in the discussion. In all cases, this disclosure presents the illustrated embodiments of the present invention by way of representation and not limitation. Numerous other minor modifications and embodiments can be devised by those skilled in the art which fall within the scope and spirit of the principles of this invention.

DETAILED DESCRIPTION

Figure 7:
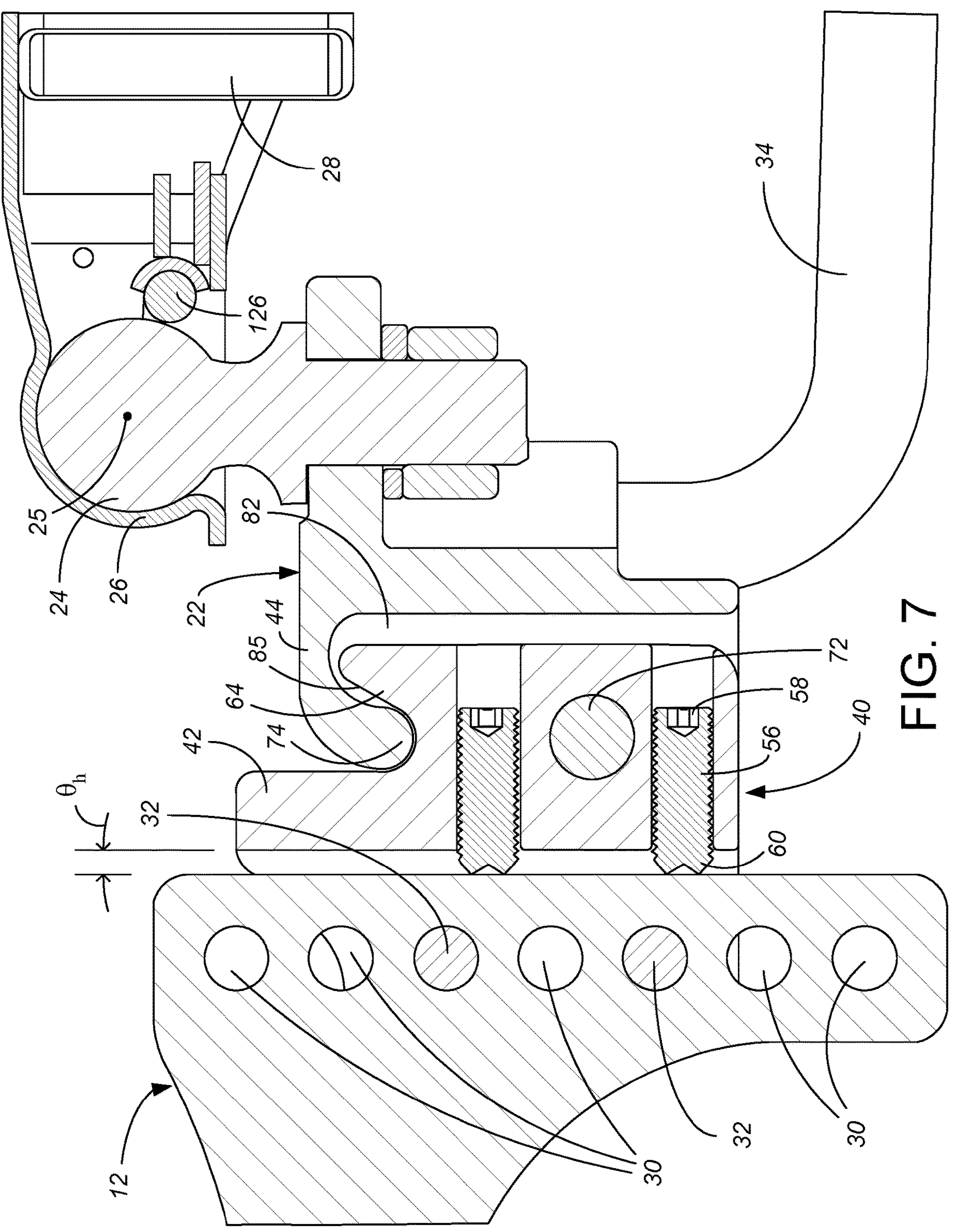
FIG. 7 is a cross-sectional side view corresponding to FIG. 6, taken along the longitudinal center line.
Figures 8, 9, 10, 11:
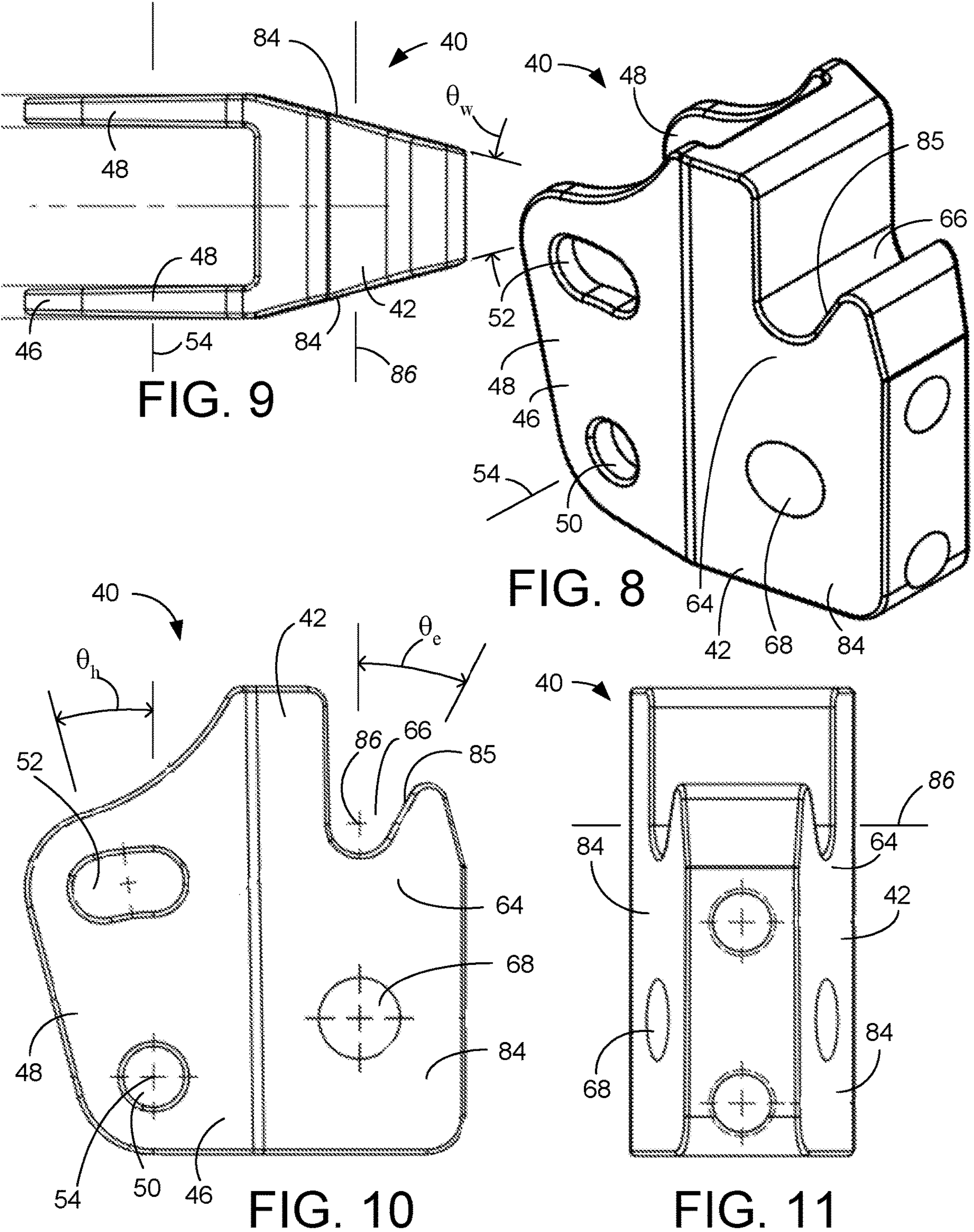
FIG. 8 is a rear perspective view of the horn of the preferred embodiment of the WD hitch of FIGS. 1-7.
FIG. 9 is a top plan view of the preferred horn of FIG. 8.
FIG. 10 is a side view of the preferred horn of FIGS. 8 and 9.
FIG. 11 is a rear end view of the preferred horn of FIGS. 8-10.
Figures 12, 13, 14, 15, 16, 17:
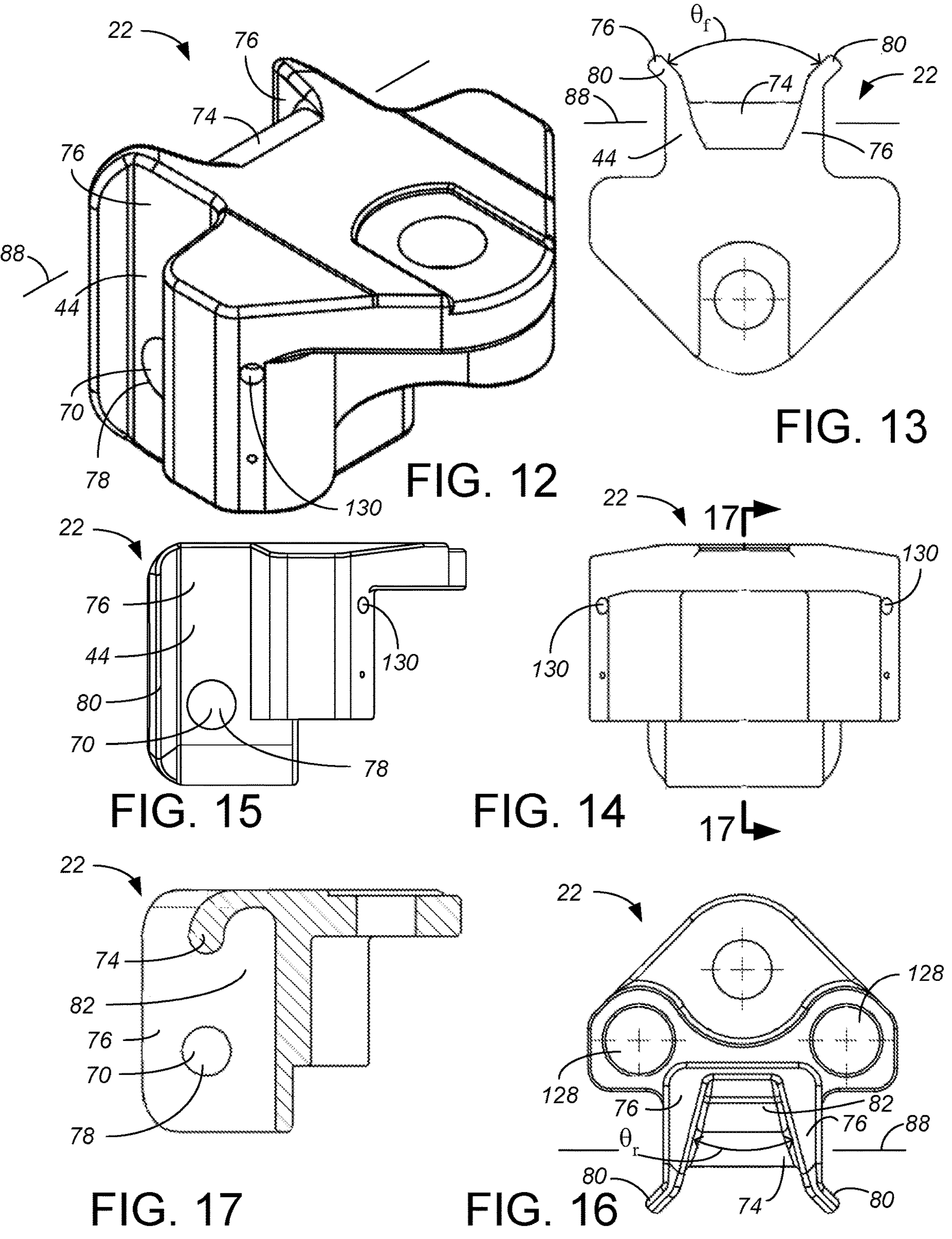
FIG. 12 is a rear perspective view of the head of the preferred embodiment of the WD hitch of FIGS. 1-7.
FIG. 13 is a top plan view of the preferred head of FIG. 12.
FIG. 14 is a rear end view of the preferred head of FIGS. 12 and 13.
FIG. 15 is a side view of the preferred head of FIGS. 12-14.
FIG. 16 is a bottom plan view of the preferred head of FIGS. 12-15.
FIG. 17 is a cross-sectional side view, taken along lines 17-17 in FIG. 14.

The present invention is a WD hitch system 10 designed to allow a majority of the components/weight to remain attached to the trailer (not fully shown) between usages. The preferred system 10 includes a standard WD shank 12 with a leading end 14 configured to be received in a standard receiver tube 16 of a towing vehicle (not shown). In the preferred embodiment shown, this is a 2×2 inch square tube 16 which extends longitudinally, with through-holes 18 positioned mid-height on its sides to allow the shank 12 to be secured to the receiver tube 16 with a standard hitch pin 20. The shank 12 supports a weight distribution head 22 with a tow ball 24 projecting upwardly above a neck, with the center 25 (called out only in FIG. 7) of the tow ball 24 providing the towing articulation point 25 about which the towed vehicle/trailer moves relative to the towing vehicle. Such tow balls are well-known and come in standard diameters, such as 1⅞", 2" and 2½", with the drawings depicting a 2" diameter tow ball 24 secured to the head 22 with a nut. The nut attachment allows the tow ball 24 to be substituted with a differently sized tow ball (not shown) for any particular trailer coupler. During towing, the tow ball 24 mates into a trailer coupler 26 on the tongue 28 of the towed vehicle (not further shown).

Better towing handling is generally achieved by having the trailer level to the road bed, and the preferred shank 12 allows adjustment of the height of the head/tow ball relative to the height of the receiver tube 16. While height adjustment can be performed with a variety of known shank structures, the preferred shank 12 shown includes seven transverse bolt holes 30, vertically spaced at 1¼" intervals, for receiving two connection bolts 32 with one bolt hole 30 left open between the two connection bolts 32 and thus allowing selection of the head/tow ball to be at any of five different 1¼" spaced elevations relative to the receiver tube 16.

Two WD spring bars 34 extend rearwardly from the WD head 22. Somewhat like arms of a wheelbarrow, the distal ends 36 of the spring bars 34 are lifted upwardly and held by the trailer frame 38 to provide the WD transfer of load off the rear axle of the towing vehicle and onto the front axle of the towing vehicle. The weight distribution spring bars 34 transfer a weight distribution load and moment between the towing vehicle tongue 28 and the towed vehicle shank 14 about the hitch ball 24. The present invention can be applied to any shank, tow ball and spring bars arms known or used in the WD hitch art, and the specific constructions of the receiver tube 16, shank 12 (together with its hitch pin 20 and two connection bolts 32), tow ball 24, trailer coupler 26 and spring bars arms 34 are not further detailed herein.

Using the two connection bolts 32, the shank 12 supports a horn 40. The trailing end 42 of the horn 40 and the leading end 44 of the head 22 are configured to allow a readily detachable connection. With this readily detachable connection, after initial attachment, the head 22, tow ball 24 and spring bars 34 can be left attached to the trailer, even as the trailer may be repeatedly hitched and unhitched from the towing vehicle. After the head 22 is detached from the horn 40 so the trailer is no longer being towed, the decision of whether to drive the towing vehicle with the shank 12 and horn 40 projecting out the back of the receiver tube 16 is left to the user. Because the horn 40 terminates much closer to the towing vehicle than the distal ends 36 of the spring arms 34, and because the entirety of the horn 40 is fixed relative to the towing vehicle without pivoting like the spring arms 34, some users will leave the shank 12 and horn 40 when driving the towing vehicle after switching from a towing to a non-towing configuration. Other users will remove and store the horn 40 and the shank 12 when switching the towing vehicle from a towing to a non-towing configuration. Still other users will remove the two connection bolts 32, detach the horn 40 from the shank 12 and leave the shank 12 attached out the back of the receiver tube 16, particularly if the standard shank 12 is used for other towing configurations and/or to tow other loads. In either of these events, with the weight of the head 22, tow ball 24 and spring arms 34 left attached to the trailer, dismantling and handling of the horn 40 and/or shank 12 and horn 40 is much easier than dismantling and handling a standard WD hitch.

The structure of the preferred horn 40 is best shown with regard to FIGS. 6-11. The front end 46 of the horn 40 is designed for bolt attachment to the shank 12, such as having two horn wings 48 with two through-holes 50, 52 through each horn wing 48. The horn wings 48 are essentially parallel plates that extend vertically and longitudinally, spaced by a transverse gap of about 2" to receive the shank 12 between the two wings 48. The horn wings 48 need to be strong enough to rigidly transfer the towing forces, such as having a thickness of about 7/16" when the horn 40 is formed from 40 Cr Mo structural steel.

In the preferred embodiment, one set 50 of the through-holes, such as the lower through-holes, is circular, sized to match the bolt holes 30 through the shank 12, with the preferred connection using ¾" diameter connection bolts 32. The other set 52 of the through-holes, such as the upper through-holes, is preferably arcuate (a/k/a "slotted"). The arcuate through-holes 52 allow limited pivoting of the horn 40 relative to the shank 12 about the transverse axis 54 of the circular through-holes 50, so the angle $\theta_h$ of the horn 40 relative to the shank 12 can be adjusted between any of a plurality of angles. The horn 40 includes a mechanism, such as two set screws 56 called out in FIGS. 3 and 7, that (in combination with the arcuate "slotted hole" 52), allow its angle relative to the shank 12 to be set and changed. The preferred set screws 56 are both at the vertical longitudinal mid-plane of the horn 40, vertically spaced apart such as within a range of 2-3". Allen heads 58 for the set screws 56 are exposed on the trailing end 42 of the horn 40, while the leading, bearing end 60 of the set screws 56 can be advanced through the horn 40 into contact with the trailing side 62 of the shank 12, so the angle $\theta_h$ of the horn 40 (called out in FIG. 7) can be adjusted with a simple/common allen wrench (not shown) whenever the head 22 is not connected. In the preferred embodiment, the arcuate through-holes 52 are sufficiently long to enable precise adjustment of the horn angle $\theta_h$ within a range of about 0 to 16°. With the distal ends 36 of the spring arms 34 being about 3 feet from the horn pivot axis 54 defined by the circular through-holes 50, adjusting the horn angle $\theta_h$ by about 160 results in changing the elevation of the distal ends 36 of the spring arms 34 by about 10", and the spring force provided by the spring arms 34 can be precisely and easily controlled to correspond to the desired axle distribution of a wide range of different tongue weights.

The horn 40 includes a seat 64 on its trailing end 42 for ready attachment of the head 22 and supporting the weight of the head 22. The seat 64 defines a rest recess 66, accessible from above, so mating hook structure in the head 22 can be lowered into the seat 64. The horn 40 defines a horn attachment pin opening 68 spaced from the rest recess 66. Once the head 22 is lowered into the rest recess 66 so the weight of the head 22 is supported, the horn attachment pin opening 68 will align with a head attachment pin opening 70 in the head 22. A single attachment pin 72 best shown in FIG. 3 can then be inserted to secure the head 22 to the horn 40.

The structure of the preferred head 22 is best shown with regard to FIGS. 6, 7 and 12-17. The leading end 44 of the head 22 includes a hook portion 74 projecting downwardly between two head wings 76. A single set of two aligned through-holes 78 is defined through the head wings 76, providing the head attachment pin opening 70. In the preferred manufacturing process, the head 22 is cast from 40 Cr Mo structural steel.

The seat shape and the shape of the leading end 44 of the head 22 have several features to better align the head 22 into mating engagement with the horn 40 during the attachment process. Firstly, the head wings 76 have opening convergence flares 80 and an underhook recess 82, and the seat 64 has wedged sides 84. The opening convergence flares 80 define a flare angle $\theta_f$ (called out in FIG. 13) which is greater than zero; the underhook recess 82 defines a recess angle $\theta_r$ (called out in FIG. 16) which is greater than zero, and the wedged sides 82 define a wedge angle $\theta_w$ (called out in FIG. 19) which is greater than zero. When measured in a horizontal plane, these angles $\theta_f$, $\theta_r$, $\theta_w$ are preferably all less than 120°. In the most preferred embodiment, when measured in a horizontal plane, the flare angle $\theta_f$ is 90°, the recess angle $\theta_r$ is 30°, and the wedge angle $\theta_w$ is 30°. These angles $\theta_f$, $\theta_r$, $\theta_w$ help to center the head 22 relative to the horn 40 while backing up the towing vehicle during the attachment process.

Secondly, the seat 64 include a slope entry 85 which is at a greater than zero slope entry angle $\theta_e$ (called out in FIG. 10) to a transverse vertical plane. The slope entry angle $\theta_e$ is preferably less than 45°. In the most preferred embodiment, the slope entry angle $\theta_e$ is 28°. The slope entry angle $\theta_e$ helps to longitudinally pull the head 22 and horn 40 together during lowering of the head 22 onto the horn 40, particularly useful while the head 22 is at an angle to the horn 40 because the head 22 is merely hanging from the tow ball 24 and trailer coupler 26.

Thirdly, the preferred rest recess 66 is cylindrical defining a transverse rest recess axis 86, while the hook 74 portion is also cylindrical defining a transverse hook axis 88. While towing, the rest recess axis 86 nearly (but preferably not exactly) coincides with the transverse hook axis 88, such as being offset by less than 0.04". The cylindrical shapes help to better align the head 22 with the horn 40 during the attachment process. In the most preferred embodiment, the rest recess 66 defines a cylinder of slightly greater than ¾" in diameter, while the hook 74 defines a cylinder of slightly less than ¾" in diameter. The slight difference in diameter between the rest recess 66 and the hook 74 helps prevent any frictional or corrosion sticking between the head 22 and horn 40 for easier alignment of the horn attachment pin opening 68 and the head attachment pin opening 70 during hitching, and for easier detachment of the head 22 and horn 40 during unhitching.

Figure 1:
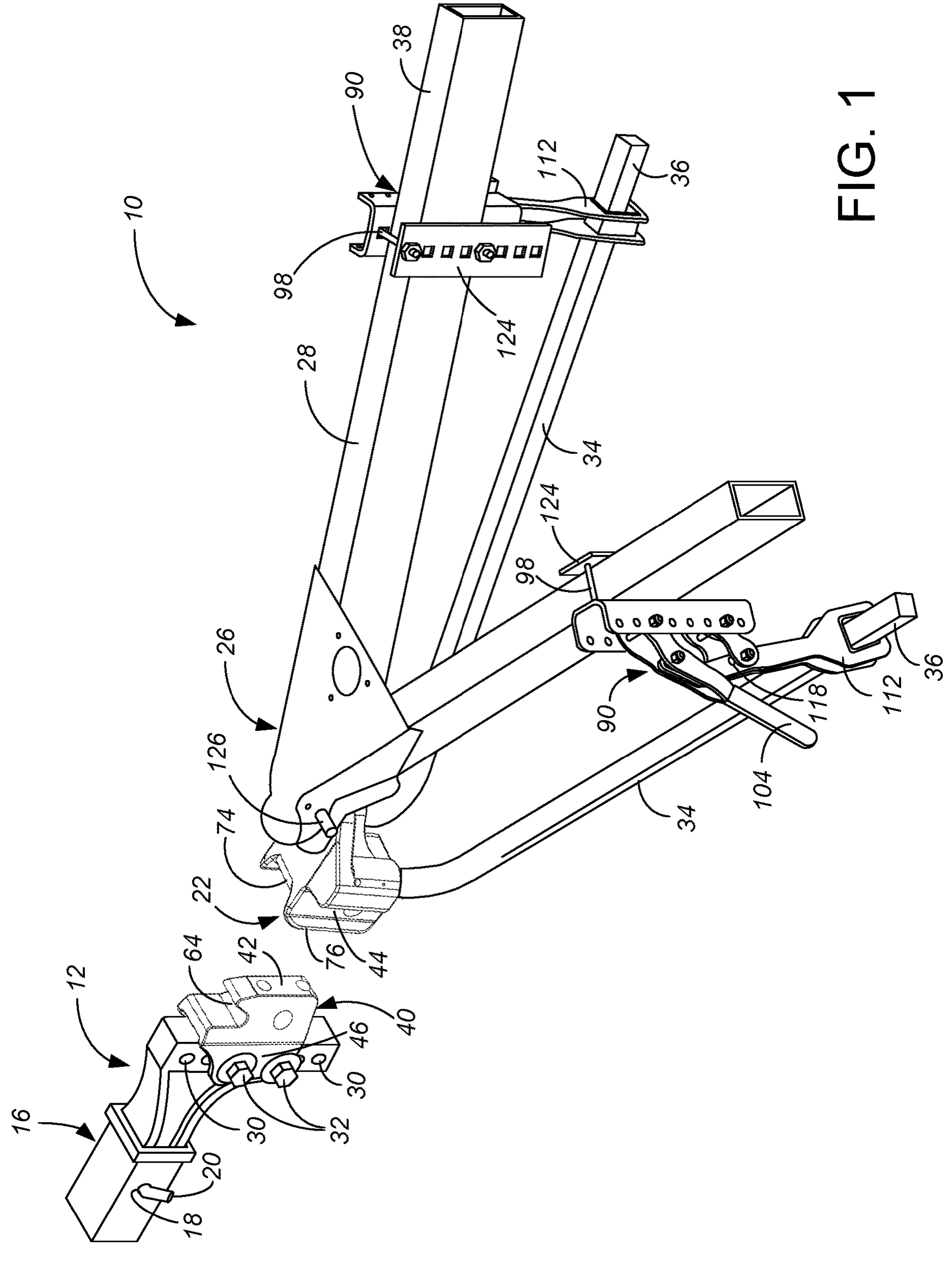
FIG. 1 is a rear isometric view of a preferred embodiment of the WD hitch of the present invention, attached to the receiver tube of the towing vehicle and to the trailer frame, but in a disconnected state.
Figure 2:
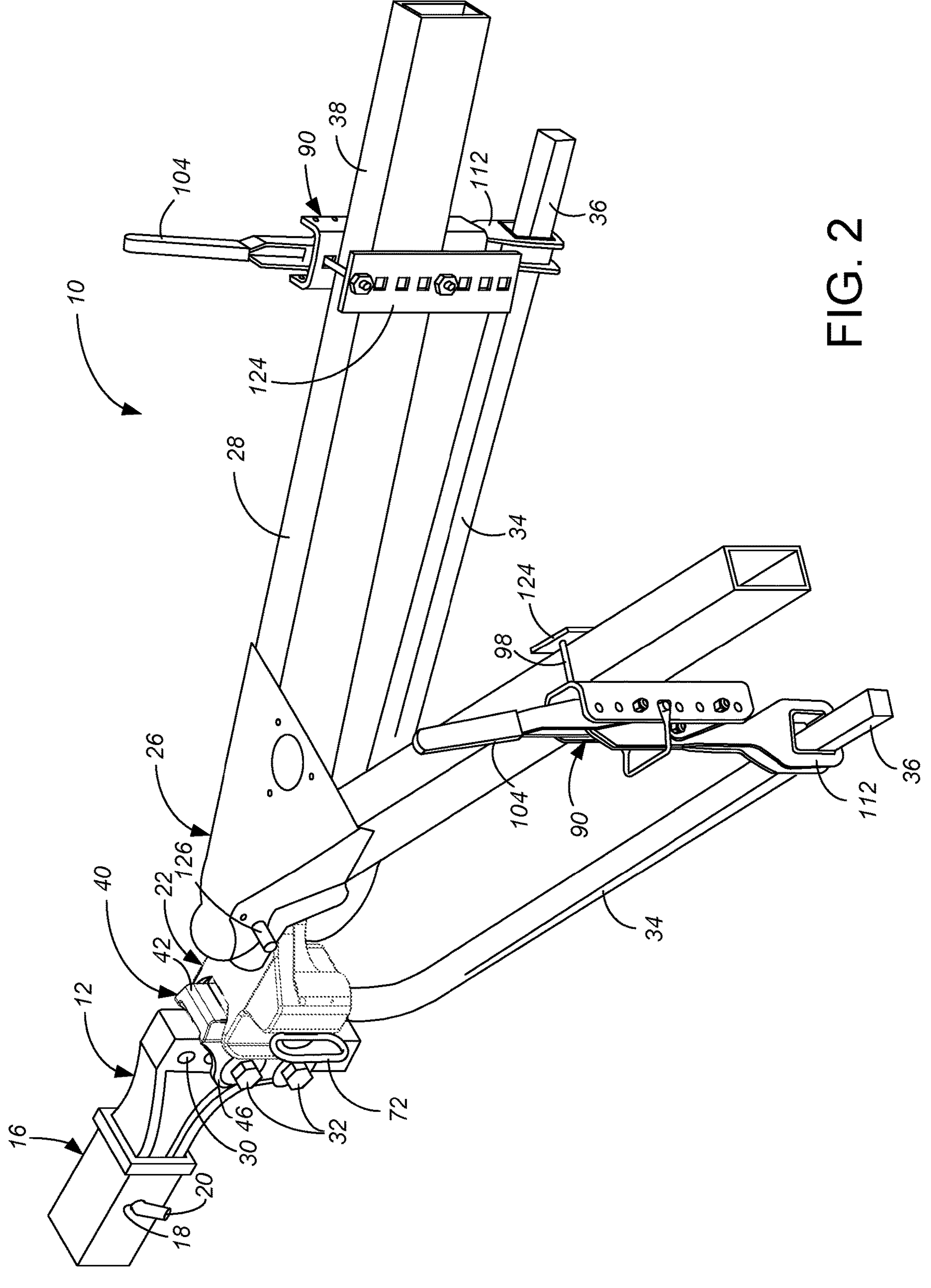
FIG. 2 is a rear isometric view of the embodiment of FIG. 1, in a connected state.
Figure 3:
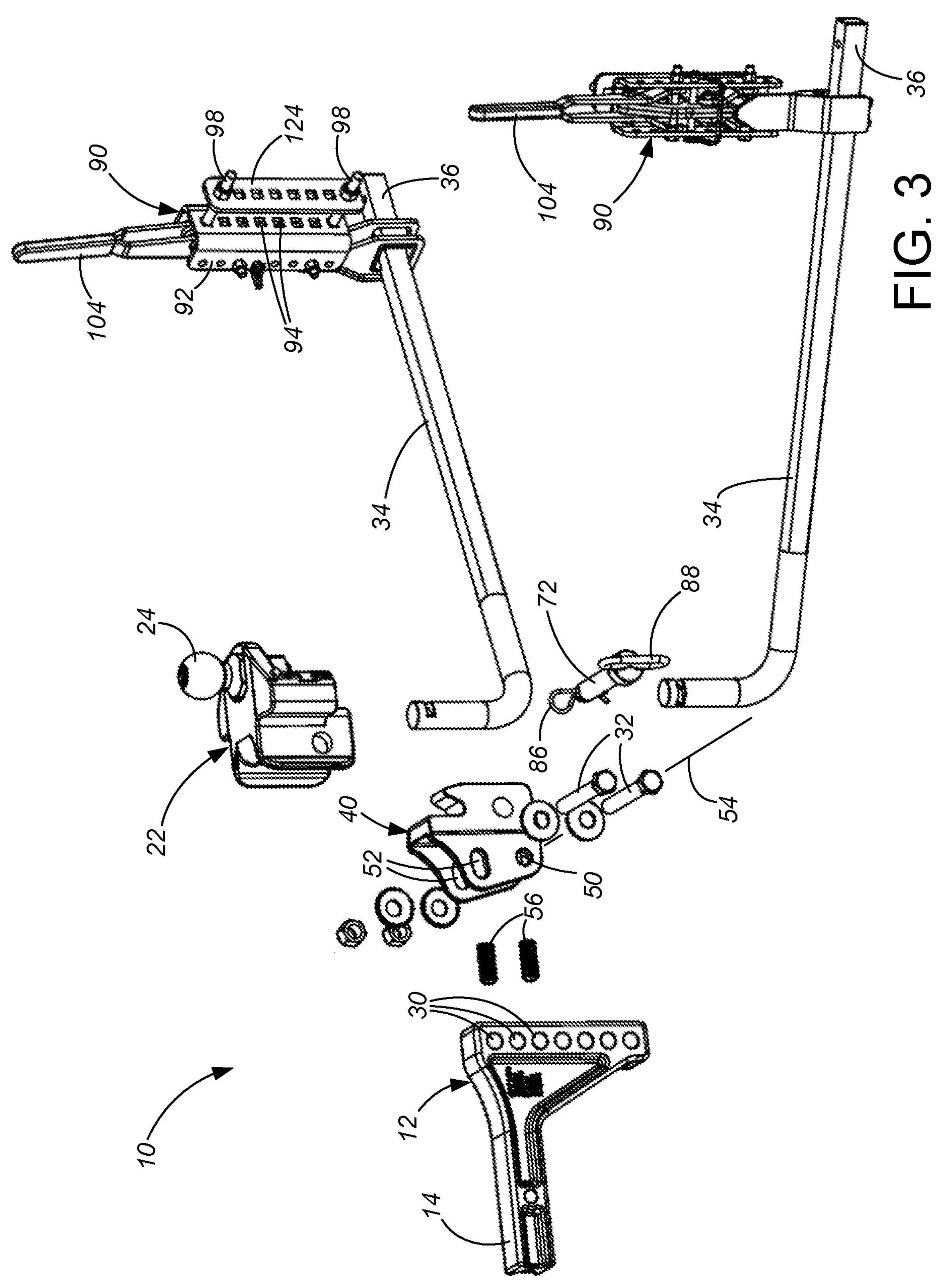
FIG. 3 is an exploded front perspective view of the WD hitch of FIGS. 1 and 2, showing neither the receiver tube nor the trailer frame.
Figures 4, 5:
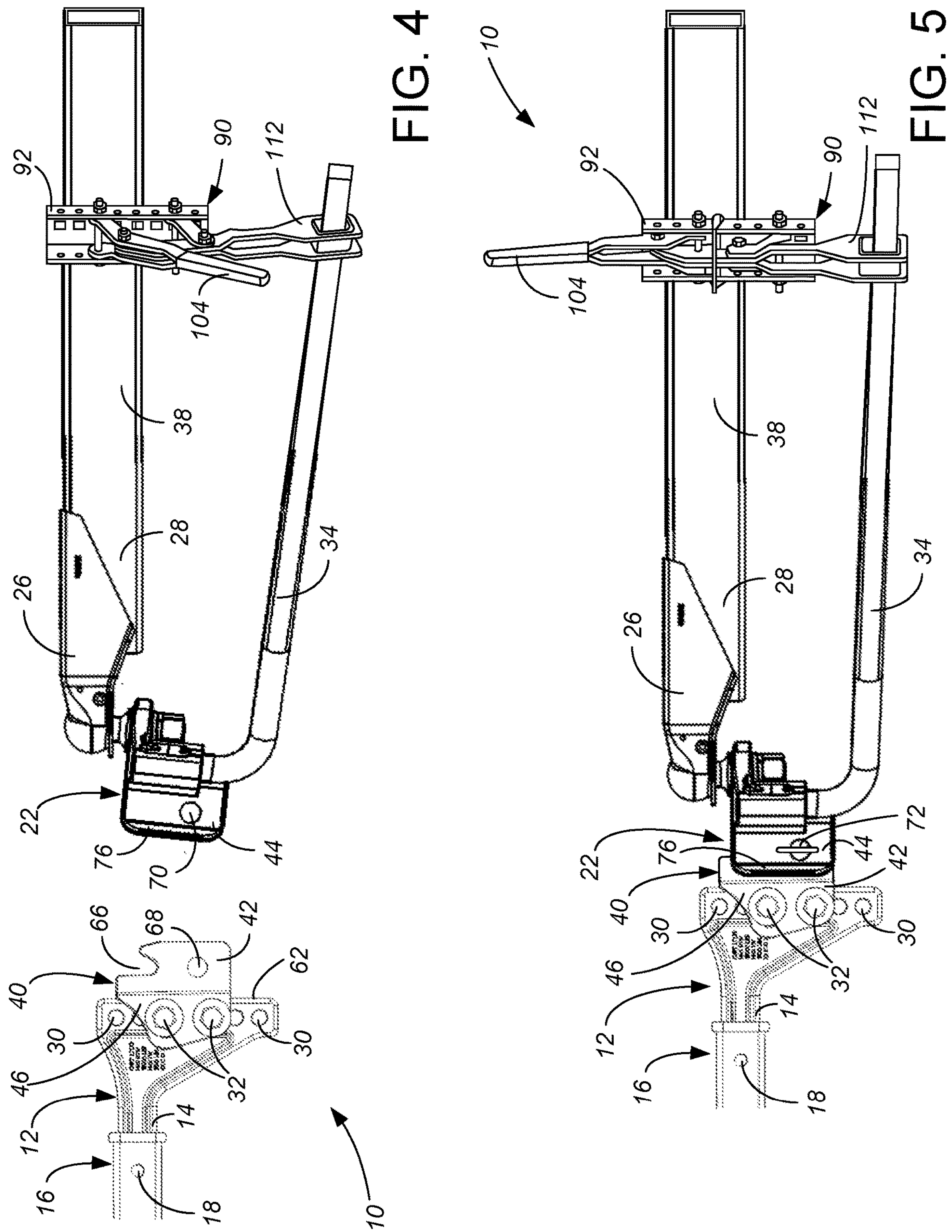
FIG. 4 is a side view of FIG. 1, omitting some of the attachment hardware.
FIG. 5 is a side view of FIG. 2, omitting some of the attachment hardware.
Figure 6:
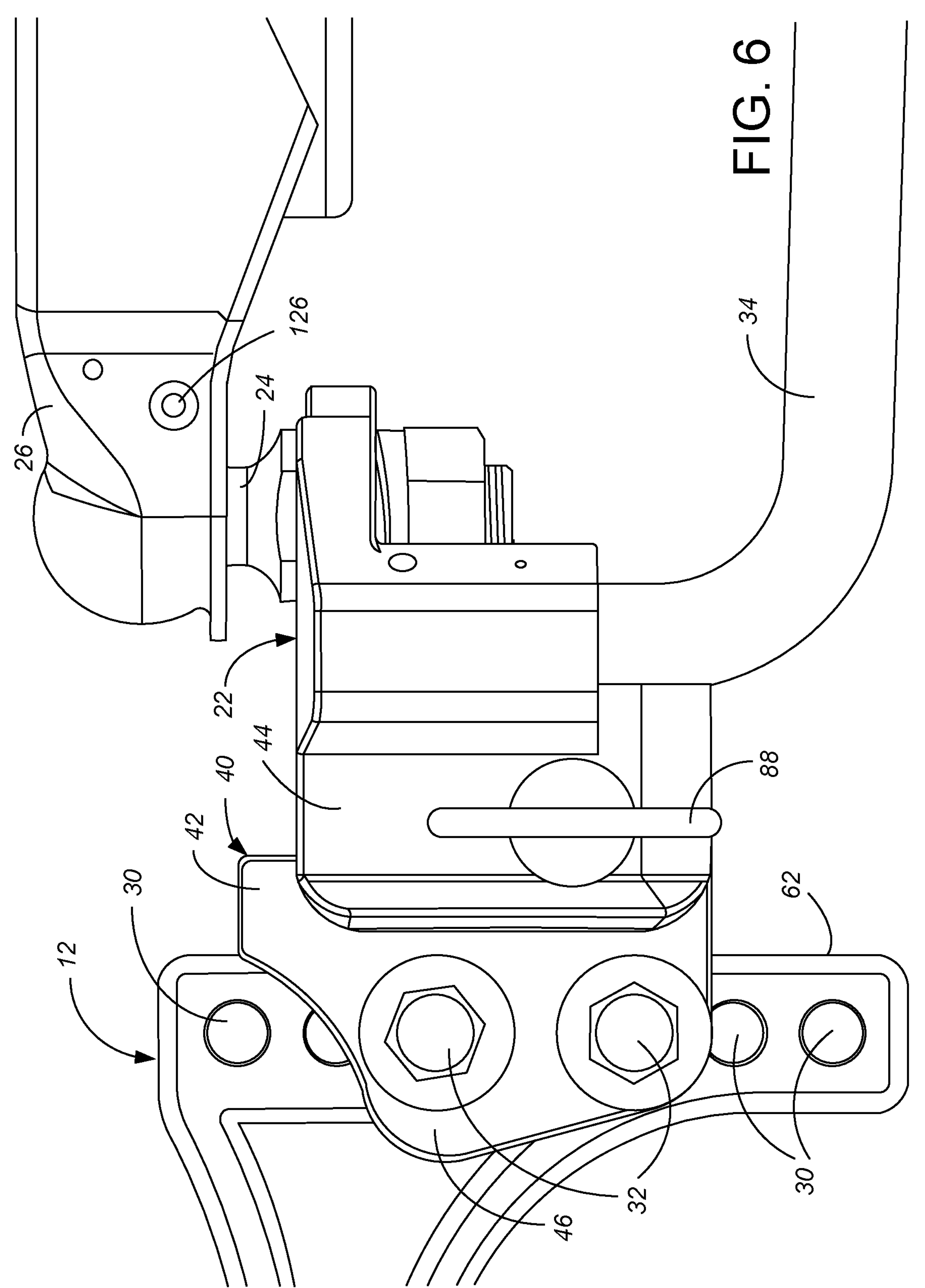
FIG. 6 is an enlargement of a portion of FIG. 5.

With the mating interaction of the hook 74 into the seat 64 of the horn 40, the preferred connection between the head 22 and the horn 40 is accomplished and completed with only a single attachment pin 72 and clip 86 independently shown in FIG. 3. Alternatively, the head 22 could be formed such as by welding plate steel pieces, and then a second pin (not shown) could be used to rest in the horn seat 64 and connect the head 22 to the horn 40. In the most preferred embodiment, the single attachment pin 72 is 1" in diameter, formed of 1035 carbon steel. The attachment pin 72 has a head with a pin handle 88 to enable the attachment pin 72 to be pulled by hand when the trailer is at an appropriate jack height relative to the towing vehicle. If desired, the pin handle 88 can be coated or formed of a material which can stay cleaner and be easier to grasp than carbon steel, such as dipping the handle 88 in a rubberized PVC coating. The pin handle 88 can then be formed with a quickly identifiable color, thereby signaling to the user which pin needs to be pulled to unhitch. To prevent unintended disengagement, the attachment pin 72 is held in place with a cotter pin clip 86.

The preferred WD hitch system 10 also includes two dual linkage snap-up brackets 90 which are mounted to the trailer frame 38 and used to apply spring force to the spring arms 34. The hardware attaching the snap-up bracket 90 to the trailer frame 38 allows a significant degree of vertical adjustment for controlling the spring force for any given trailer. An alternative embodiment uses a conventional chain attachment (not shown) for the spring bars 34. However, the preferred snap-up brackets 90 provide a significant mechanical advantage for raising the spring arms 34, while the precise angle control provided by the mechanism 56 allows the spring arms 34 to provide a more accurate and reproducible WD force.

The preferred hardware for attaching the snap-up bracket 90 to the trailer frame 38 includes an adjustment channel 92. As best shown in FIG. 3 and called out in FIG. 18, the adjustment channel 92 includes a series of through holes 94 along its back 96, such as having a series of eight square holes 94 at one inch spacing to receive two shoulder bolts 98 for securing the adjustment channel 92 to the trailer frame 38. The adjustment channel 92 includes side flanges 100, extending perpendicular to the back 96. The side flanges 100 provide supporting structures such as eight sets of circular pivot holes 102 spaced at 1" spacing along the height of the side flanges 100.

Figures 18, 19:
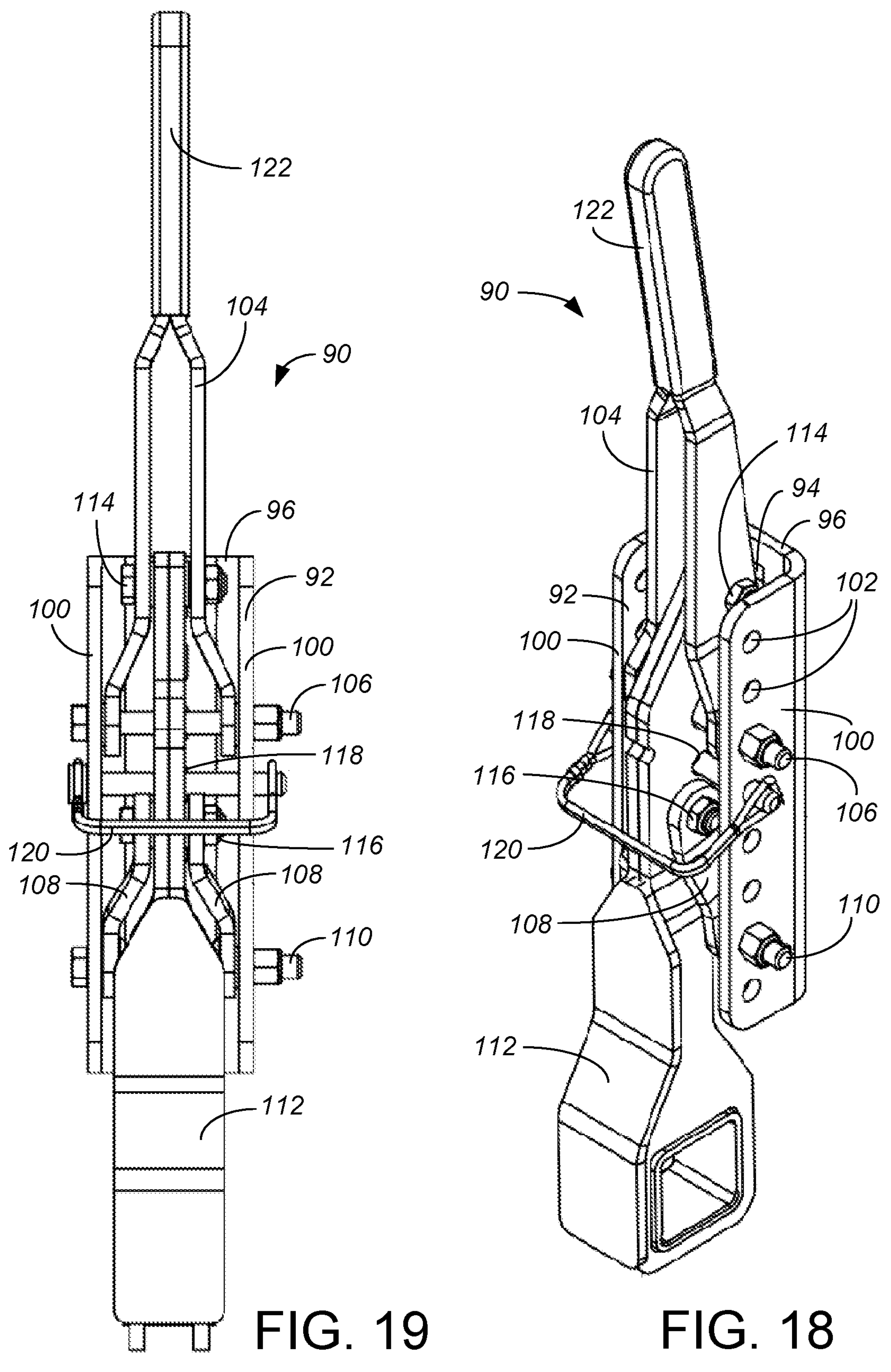
FIG. 18 is a perspective view of one of the spring bar tightening bracket assemblies of the preferred embodiment of the WD hitch of FIGS. 1-7, shown with an additional optional cover for the spring bar holder.
FIG. 19 is a side view of the spring bar tightening bracket assembly of FIG. 18.

As best shown in FIGS. 18 and 19, a pivot handle 104 is pivotally secured to the adjustment channel 92 by a bolt 106 and nut through a selected one of the top four sets of circular pivot holes 102. A pivot link 108 is pivotally secured to the adjustment channel 92 by a bolt 110 and nut at a location four pivot holes 102 below the pivot handle attachment. A spring bar holder weldment 112 is then pivotally attached with bolts 114, 116 and nuts to both the pivot handle 104 and the pivot link 108. Together with the adjustment channel 92, the pivot handle 104, the pivot link 108 and the spring bar holder weldment 112 make up four bars of a four bar mechanism. In the preferred embodiment, the pivot handle 104 and the spring bar holder weldment 112 are each formed by welding two plate steel pieces together, with separations as needed, and the pivot link 108 is provided in two mirror-image pieces. With this construction, the entire snap-up bracket 90 is bilaterally symmetrical about the vertical centerline of the adjustment channel 92, thereby avoiding supporting any of the spring bar forces in a cantilevered fashion. In the preferred embodiment, each of the pivot handle 104, pivot link 108 and spring bar holder weldment 112 are formed from a strong metal such as Q235 carbon structural steel stamped from 6 mm thick plates.

In the preferred embodiment, a length of nearly 2½" extends in both the pivot handle 104 and the pivot link 108 between their two pivot axes, such that a throw within a range of 150-180° of the handle 104 will raise the spring bar holder weldment 112 nearly 5". That is, the center lines of the two bolts 106, 114 through the pivot handle 104 are spaced by nearly 2½", and the center lines of the two bolts 110, 116 through the pivot link 108 are spaced by nearly 2½". The lower end of the spring bar holder weldment 112 receives the distal end 36 of the spring bar 34 in a relationship that allows the spring bar 34 to slide longitudinally within the spring bar holder weldment 112 as the towing vehicle and trailer proceed through turns, and that also allows slight twisting of the distal end 36 of the spring bar 34 relative to the spring bar holder weldment 112 as the spring bar holder weldment 112 is raised or lowered and/or as the roadbed changes sideslope during towing.

A locking hole 118 is positioned through the spring bar holder weldment 112, and, when the pivot handle 104 is fully raised, this locking hole 118 aligns with an open set of the circular openings 102 in the adjustment channel 92. A wire lock clevis pin 120 can then be used through the aligned holes 118, 102 to secure the spring bar holder weldment 112 in its fully raised position.

If desired, a handle grip 122 can be used on the distal end of the pivot handle 104, coated or formed of a material which can stay cleaner and be easier to grasp than carbon steel, such as inserting the distal end of the pivot handle 104 in a rubberized PVC molding. The handle grip 122 can then also be formed with a quickly identifiable color, thereby signaling to the user which handle needs to be pulled to load and unload the spring arms 34.

While the snap-up brackets 90 are particularly beneficial in the WD hitch system 10 of the present invention because they leave no hanging, loose chain attached to the trailer frame 38, the snap-up brackets 90 of the present invention can also be readily used with traditional WD hitches (not shown). Even if the head (not shown) and spring bars (not shown) of such a traditional WD hitch need to be removed and stored (and not attached to the trailer) when the trailer is not hitched to the towing vehicle, the snap-up brackets 90 can be left attached to the trailer frame 38. If a user desired to tow the trailer using a towing vehicle without the horn 40 of the present invention, the head 22 and spring bars 34 can be removed from the trailer and the snap-up brackets 90 can be used with prior art WD hitch heads and spring bars 34. The lower end of the spring bar holder weldment 112 is thus also configured to receive a variety of sizes and shapes of distal ends of spring bars commonly used in the market today.

Figure 20:
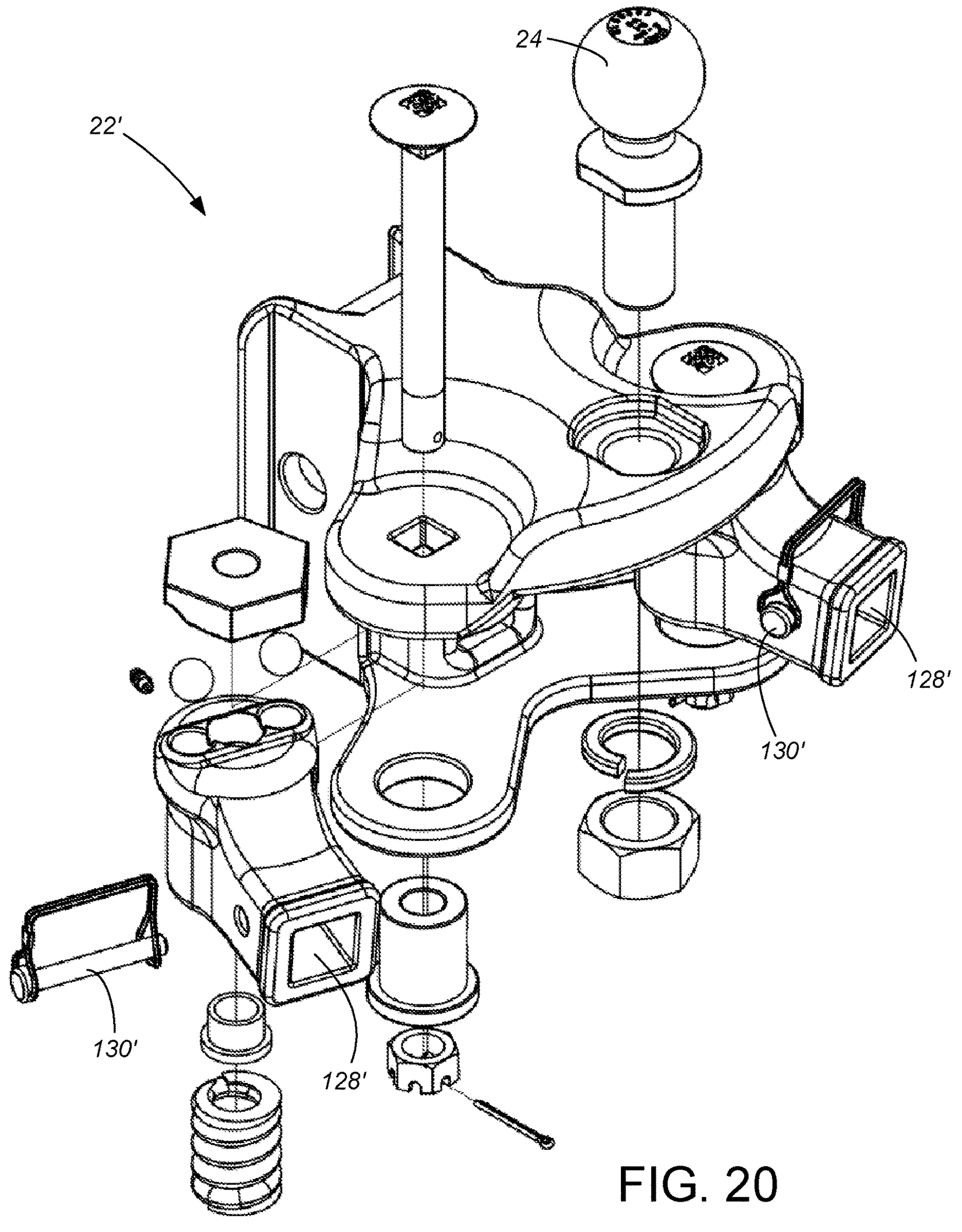
FIG. 20 is an exploded rear perspective of an alternative head assembly for use in a second embodiment of the WD hitch of the present invention.

FIG. 20 shows an exploded view of an alternative head 22' in accordance with the present invention. The spring bars (not shown) for this alternative head 22' have a straight construction which mates into longitudinally-directed sockets 128', secured with wire lock clevis-type retaining pins 130'. FIG. 20 thus represents how the present invention can be adapted to a wide variety of configurations of WD heads.

With the preferred structure of the WD hitch system 10, the preferred method of use of the WD hitch system 10 is simple and straight-forward. First the head 22 and spring bars 34 are assembled to each other (if necessary) and to the trailer coupler 26, and the adjustment channels 92 of two snap-up brackets 90 are mounted each using an adjustment plate 124 and two carriage bolts 98 to one of the two sides of the trailer frame 38. The ball 24 of the head 22 is inserted into the trailer coupler 26, and the coupler 26 is latched to the ball 24 and secured with a trailer pin 126 as typical of attaching a trailer coupler to a ball. The spring bars 34, if shipped separate from the head 22, are simply pushed up into the head sockets 128 until each snaps into place via a retaining pin 130 in the hitch head 22. Carriage bolts 98, spaced an appropriate distance apart for the vertical height of the trailer frame tubing 38, are used with the adjustment plate 124 to attach the adjustment channel 92 to the trailer frame 38. With the carriage bolts 98 still loose, the snap-up brackets 90 can be slid longitudinally along the trailer frame 38 until an appropriate distance from the head 22, typically with about four inches of spring bar 34 extending through the spring bar holder weldment 112. The height of the snap-up brackets 90 is adjusted until, with the pivot handle 104 and spring bar holder weldment 112 raised, the spring bars 34 extend parallel to the trailer frame tubing 38, with at least one inch of clearance between the tops of the spring bars 34 and the bottom of the trailer frame tubing 38. Nuts for the shoulder bolts 98 and the pivot bolts 106, 110 can then be tightened down.

The next step is to select the height and angle of the horn 40. With the trailer supported by the trailer jack (not shown) such that the trailer frame 38 is level to the road bed, the horn 40 is attached to the shank 12 at an elevation that best matches the hook 74 of the head 22 to the tip of the horn 40. The horn connection bolts 32 can then be inserted at this elevation. The user measures and records the height of the front and rear bumpers (not shown) of the towing vehicle to the pavement. The towing vehicle is backed up with the horn 40 under the head 22. With the snap-up bracket 90 down so the spring bars 34 are unloaded, the user then lowers the trailer jack so the head 22 seats on the horn 40 and the locking pin holes 68, 70 in the head 22 and horn 40 line up. The user then inserts the locking attachment pin 72 through the aligned holes 68, 70 in the head 22 and horn 40, securing the locking attachment pin 72 with the cotter pin clip 86. By pivoting the pivot handle 104 upward, the user snaps up each snap-up bracket 90 upward, locking each spring bar holder weldment 112 in its raised position with its wire lock clevis pin 120 before taking lifting pressure off the pivot handle 104. The user then measures the heights of the front and rear bumpers again. If the front and rear bumper heights are within ½" of the initial heights, no further adjustment is needed.

If either bumper has changed more than ½" from its initial height, then the angle of the horn 40 relative to the shank 12 needs to be adjusted. The user unpins and lowers each of the two pivot handles 104, removes the cotter pin clip 86 and locking attachment pin 72, and jacks the trailer up until the head 22 unseats from the horn 40, arranging to allow access to the set screws 56. The user advances one (usually the top one) of the set screws 56, and tries again by positioning and lowering the trailer-supported head 22 onto the horn 40 such that both the front and back bumper of the towing vehicle are still within ½" of starting bumper heights. Maximum weight distribution is reached when the locking attachment pin 72 can no longer be inserted into the head and horn 40 freely. Once the angle of the horn 40 is set so the front and rear of the towing vehicle are equally being loaded, the bolts/nuts 32 securing the horn 40 to the shank 12 are torqued tight. The trailer jack is then fully lowered so the entire trailer tongue weight is supported by the hitch system 10. The WD hitch system 10 then should not need further adjustment for towing that particular loaded trailer as many times as desired.

To uncouple the adjusted WD hitch system 10, the user raises the trailer by lowering the trailer jack down to take the load off of the spring bars 34. The user can then pull the wire lock clevis pins 120 and lower the pivot handles 104 one side at a time. After the pivot handles 104 of the snap-up brackets 90 have been lowered, the user then pulls the cotter pin clip 86 and lowers the trailer by raising the jack until the locking attachment pin 72 can be removed from the head 22 and horn 40. After the locking attachment pin 72 is removed, the user uses the trailer jack to raise the trailer and take the head 22 off the horn 40. The snap-up brackets 90 are kept with the pivot handle 104 lowered when not towing.

After the head 22 has been decoupled from the horn 40, the user can then remove the horn 40 and shank 12 from the receiver tube 16; most users will be able to handle the combined weight of the horn 40 and shank 12 without unbolting the horn 40 from the shank 12. Even if the user decides to unbolt the horn 40 from the shank 12, the set screws 56 can be left in their adjusted position for setting the angle of the horn 40 and head 22 for that particular trailer/load. Alternatively, the user can drive the towing vehicle with the shank 12 and horn 40 projecting out the back of the receiver tube 16, with it being noted that the horn 40 is longitudinally much closer to the rear bumper of the towing vehicle than the full extent of the spring arms 34 would be.

To recouple the towing vehicle to the trailer, after reinserting the shank 12 with horn 40 into the receiver tube 16 (if necessary), the user again backs up the towing vehicle until the horn 40 is under the head 22. The user lowers the trailer tongue 28 with the trailer jack until the locking attachment pin 72 can be inserted, raises the trailer tongue 28 (if necessary) until the pivot handles 104 of the snap-up brackets 90 can be thrown upward, and then fully raises the trailer jack so the entire tongue weight is on the WD hitch 10.

It will thus be understood that the present invention allows the user to (after initial assembly) easily leave the head 22 and spring bars 34 attached to the trailer, with the head 22 being easily attachable and detachable to the horn 40 and using only a single locking pin 72. After initial assembly, the weight of the head 22, the spring bars 34 and the snap-up brackets 90 can always be left attached to the trailer. The trailer jack is used as necessary so the single locking pin 72 can be inserted or removed and so the spring bars 34 can be raised and lowered using the pivot handles 104 of the snap-up brackets 90.

Although the present invention has been described with reference to preferred embodiments, workers skilled in the art will recognize that changes may be made in form and detail without departing from the spirit and scope of the invention. In particular, all of the dimensions and materials, unless included in the claims, are exemplary only.

What is claimed is:

1. A separable weight distribution hitch for towing a towed vehicle having a trailer coupler on a tongue behind a towing vehicle, the hitch comprising:

a shank insertable into a receiver tube of a towing vehicle;

a horn attachable to the shank at any of a plurality of angles about a transverse axis relative to the shank, the horn having rest recess accessible from above, the horn defining a horn hitch pin opening spaced from the rest recess;

a head with a hitch ball, the head comprising a downwardly projecting hook portion sized to mate into the rest recess so as to support at least part of weight of the head as well at least part of tongue weight of the towed vehicle tongue, the hitch ball being exposed such that a trailer coupler can be placed over the hitch ball and secured to the hitch ball to provide a hitch ball pivoting connection for a towed vehicle, the head defining a head hitch pin opening spaced from the hook portion, the mating interaction between the hook portion and the rest recess allowing the horn hitch pin opening to be aligned relative to the head hitch pin opening to allow insertion of a hitch pin into the aligned horn hitch pin opening and head hitch pin opening;

weight distribution spring bars each having a proximal end in a pivoting connection with the head, attachment structure securable to the towed vehicle tongue, the attachment structure having a loosened configuration and a tightened configuration, the attachment structure in the tightened configuration being able to vertically bias distal ends of the weight distribution spring bars such that the weight distribution spring bars transfer a weight distribution load and moment between the towing vehicle tongue and the towed vehicle shank about the hitch ball; and a hitch pin sized for mating insertion into the aligned horn hitch pin opening and head hitch pin opening during lowering of the tongue.

2. The separable weight distribution hitch of claim 1, wherein the attachment structure comprises two snap-up brackets, each snap-up bracket comprising:

a four bar mechanism having a first bar for fixing to a trailer frame;

a handle pivotally secured to the first bar as a second bar;

a holder arm pivotally secured to the handle as a third bar, the holder arm being configured for attachment to one of the weight distribution spring bars; and a pivot link pivotally secured to both the first bar and the holder arm as a fourth bar.

3. The separable weight distribution hitch of claim 2, wherein the first bar and the holder arm each include at least one locking hole opening, so the holder arm can be held upward by a locking pin through the locking hole opening when the holder arm is in a raised position.

4. A separable hitch connection for use between a towing vehicle shank and a hitch ball for a towed vehicle tongue, comprising:

a horn which can be fixed relative to the towing vehicle shank so as to provide a seat with a rest recess accessible from above;

a head which can be fixed relative to the hitch ball, the head comprising a downwardly projecting hook portion sized to mate into the rest recess so as to support at least part of weight of the head as well at least part of tongue weight of the towed vehicle tongue from the seat, the head defining a head hitch pin opening spaced from the hook portion, the mating interaction between the hook portion and the rest recess allowing the horn hitch pin opening to be aligned relative to the head hitch pin opening to allow insertion of a hitch pin into the aligned horn hitch pin opening and head hitch pin opening; and a hitch pin sized for mating insertion into the aligned horn hitch pin opening and head hitch pin opening during lowering of the tongue.

5. A separable hitch connection for use between a towing vehicle shank and a hitch ball for a towed vehicle tongue, comprising:

a horn which can be fixed relative to the towing vehicle shank so as to provide a seat with a rest recess accessible from above;

a head which can be fixed relative to the hitch ball, the head comprising a downwardly projecting hook portion sized to mate into the rest recess so as to support at least part of weight of the head as well at least part of tongue weight of the towed vehicle tongue from the seat, the head defining a head hitch pin opening spaced from the hook portion, the mating interaction between the hook portion and the rest recess allowing the horn hitch pin opening to be aligned relative to the head hitch pin opening to allow insertion of a hitch pin into the aligned horn hitch pin opening and head hitch pin opening, wherein the head further comprises openings to receive and support weight distribution spring bars;

a hitch pin sized for mating insertion into the aligned horn hitch pin opening and head hitch pin opening during lowering of the tongue;

weight distribution spring bars each having a proximal end in a pivoting connection with the head, and attachment structure securable to the towed vehicle tongue, the attachment structure having a loosened configuration and a tightened configuration, the attachment structure in the tightened configuration being able to vertically bias distal ends of the weight distribution spring bars such that the weight distribution spring bars transfer a weight distribution load and moment between the towing vehicle tongue and the towed vehicle shank about the hitch ball.

6. The separable hitch connection of claim 5, wherein the horn comprises two through-holes for attachment at a selected elevation relative to the towing vehicle shank, each through-hole defining at least one through-hole axis with the through-hole axes being spaced from each other, and further comprising two bolts for fixing the horn to the towing vehicle shank using the two through-holes.

7. The separable hitch connection of claim 6, wherein the head comprises a vertically-oriented hitch ball through-hole, located rearward of the hook portion, for attachment of the hitch ball such that a trailer coupler can be placed over the hitch ball and secured to the hitch ball to provide an articulating hitch connection for a towed vehicle.

8. The separable hitch connection of claim 6, wherein at least one of the through-holes is arcuate so as to allow a range of bolt positions relative to the arcuate through-hole.

9. The separable hitch connection of claim 8, wherein the horn comprises two set screws for adjusting a horn angle relative to the towing vehicle shank.

10. The separable hitch connection of claim 9, wherein the sets screws each have a set screw head exposed toward a rear of the horn, such that the set screws can be advanced or retracted while the head is disconnected from the horn.

11. The separable hitch connection of claim 4, wherein the rest recess is at least partially cylindrical about a transverse axis, and wherein the hook portion is at least partially cylindrical about a transverse axis.

12. The separable hitch connection of claim 11, wherein the cylinder defined by the rest recess has a greater diameter than the cylinder defined by the hook portion.

13. The separable hitch connection of claim 4, wherein the head comprises opening convergence flares defining a flare angle which is greater than zero, the convergence flares helping to center the head relative to the horn during attachment.

14. The separable hitch connection of claim 4, wherein the seat has wedged sides defining a wedge angle which is greater than zero, the wedge angle helping to center the head relative to the horn during attachment.

15. The separable hitch connection of claim 4, wherein the head comprises an underhook recess defining a recess angle which is greater than zero, the recess angle helping to center the head relative to the horn during attachment.

16. The separable hitch connection of claim 4, wherein the seat includes a slope entry which is at a greater than zero slope entry angle relative to a transverse vertical plane, the slope entry angle helping to longitudinally pull the head and horn together during lowering of the head onto the horn.

17. A method of hitching a towed vehicle having a trailer coupler on a tongue behind a towing vehicle using a separable weight distribution hitch, the method comprising:

inserting a shank into a receiver tube of a towing vehicle so as to support a horn, the horn having a seat defining a rest recess accessible from above, the horn defining a horn hitch pin opening spaced from the rest recess;

coupling a trailer coupler to a hitch ball on a head, the head comprising a downwardly projecting hook portion sized to mate into the rest recess, the head defining a head hitch pin opening spaced from the hook portion, the head having pivotally connected weight distribution spring bars transmitting a weight distribution force to a tongue behind the hitch ball;

aligning the towing vehicle and the towed vehicle such that the downwardly projecting hook portion is over the rest recess;

lowering the tongue of the towed vehicle so the downwardly projecting hook portion mates into the rest recess and so the horn hitch pin opening is aligned relative to the head hitch pin opening; and inserting a hitch pin into the aligned horn hitch pin opening and head hitch pin opening.

18. The method of hitching of claim 17, further comprising:

adjusting an angle of the horn relative to the shank prior to lowering of the tongue of the towed vehicle so the downwardly projecting hook portion mates into the rest recess and prior to inserting the hitch pin into the aligned horn hitch pin opening and head hitch pin opening.

19. The method of hitching of claim 17, further comprising:

securing an attachment structure to the towed vehicle tongue, the attachment structure having a loosened configuration and a tightened configuration, the attachment structure in the tightened configuration being able to vertically bias distal ends of weight distribution spring bars such that the weight distribution spring bars transfer a weight distribution load and moment between the towing vehicle tongue and the shank about the hitch ball.

20. The method of hitching of claim 19, wherein the attachment structure comprises two snap-up brackets, each snap-up bracket comprising:

a four bar mechanism having:

a first bar for fixing to a trailer frame;

a handle pivotally secured to the first bar as a second bar;

a holder arm pivotally secured to the handle as a third bar, the holder arm being configured for attachment to one of the weight distribution spring bars; and a pivot link pivotally secured to both the first bar and the holder arm as a fourth bar;

wherein the method of hitching comprises raising the two handles to add weight distribution load and moment to the weight distribution spring bars.

* * * * *